United States Patent Office 3,409,612
Patented Nov. 5, 1968

3,409,612
SPIRO-ANDROSTANE-OXAZOLINONES AND PROCESS FOR PREPARING THEM
Giangiacomo Nathansohn and Gianfranco Odasso, Milan, Italy, and Emilio Testa, Tessin, Switzerland, assignors to Lepetit S.p.A., Milan, Italy
No Drawing. Filed July 9, 1965, Ser. No. 470,872
Claims priority, application Great Britain, July 24, 1964, 29,760/64
15 Claims. (Cl. 260—239.55)

ABSTRACT OF THE DISCLOSURE

Spiro-androstane-oxazolinones of the formula

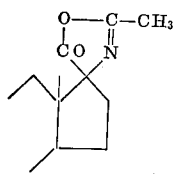

III.

and having anti-inflammatory properties, and their intermediates, are prepared by subjecting a spiro-androstane-hydantoin of the formula

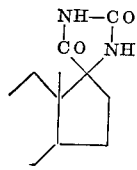

I.

to hydrolysis with an alkali metal hydroxide at 150–200° C. to form α-aminoacids of the formula

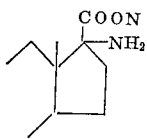

II.

The latter are then heated with acetic anhydride to produce III.

---

This invention is concerned with new steroids. More particularly, the compounds concerned with this invention are spiro-androstane-oxazolinones of the Formula III hereinbelow and the intermediate compounds for preparing the same according to the following reaction scheme:

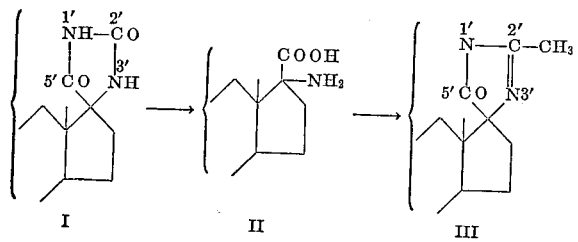

It is to be understood that the term "androstane" as used herein includes both the nuclearly saturated and the nuclearly unsaturated compounds.

It will be appreciated by all those skilled in the art that all compounds as above defined, including the starting compounds, may exist in two diastereomeric forms, according to the configuration α or β of the two groups substituted at position 17 of the steroid nucleus. The present invention is directed to all possible stereoisomeric couples of the compounds as hereinbefore defined.

The primary purpose of this invention is to provide steroidal compounds, which have shown useful properties as anti-inflammatory agents.

A further purpose of the invention is to provide a process for preparing the new steroids, spiro-androstane-oxazolinones, as well as the intermediate compounds for their synthesis.

The process which forms the subject of the present application consists in subjecting a spiro-androstane-hydantoin of the Formula I above to hydrolysis with an alkali metal hydroxide at 150–200° C. for 3–10 hours in a mixture of water and a water miscible solvent, such as for instance lower alkanols and pyridine bases, thus obtaining the α-aminoacids of the Formula II. The latter are then heated with acetic anhydride giving the spiro-androstane-oxazolinones of the Formula III.

It is to be noted that if the α-aminoacids of the Formula II are heated with acetic anhydride, and the mixture is then diluted with water at a temperature of about 50–60° C., instead of the desired spiro-oxazolines the α-acetamidoacids of the following formula are formed

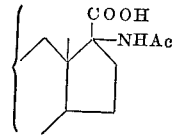

The α-acetamidoacids are possibly formed as intermediates also when the spiro-oxazolinones of this invention are prepared through the above illustrated process; they may be converted to the spiro-oxazolinones by the action of any suitable dehydrating agent.

Representative compounds of the herein claimed class of spiro-androstane-oxazolinones showing a very high antiinflammatory activity are 3β-acetoxy-spiro-[androst-5-ene-17,4'(3'α)-oxazoline]-2'-methyl-5'-one and its 3'β-isomer. Both are practically non-toxic (the intraperitoneal $LD_{50}$ in rats is higher than 1000 mg./kg.). When assayed by the granuloma pellet test in rats, doses of 50 mg./kg. of the two substances caused an average decrease in weight of granuloma of 22.59 and 21.73% respectively.

The following are examples of the preparation above indicated, although they are not intended as limiting the scope of the invention.

EXAMPLE 1

3β-acetoxy-spiro-[androst-5-ene-17,4'- (3'-β)-oxazoline]-2'-methyl-5'-one (a) Resolution of the mixture of 3β-hydroxy-spiro-[androst-5-ene-17,4'-(3'α) - imidazoline]-2',5'-dione and its 3'β-isomer. A mixture (47.3 g.) containing 3β-hydroxy-spiro-[androst-5-ene-17,4'(3'α) - imidazolidine]-2',5'-dione and its 3'β-isomer is refluxed for 10 minutes with 500 ml. of pyridine and the mixture is filtered hot. This treatment is repeated with further 500 ml. of pyridine on the residue. The insoluble is washed with water and dried. The product is the 3'α-isomer. It shows $[α]_D^{25} -114°$ (c. 0.3, pyridine) and does not melt under 350° C.

The 3'β-isomer obtained by concentration of the pyridine extract to a small volume and collecting the precipitate. It shows $[α]_D^{25} -63.8°$ (c. 0.5, pyridine) and does not melt under 350° C.

(b) 3β - hydroxy - 17β aminoandrost - 5 - ene - 17α-carboxylic acid. The above obtained 3'β-isomer (30 g.) is heated at 180° C. for 8 hours in a closed vessel with 30 g. of potassium hydroxide and 470 ml. of aqueous 80 percent ethanol. After cooling the mixture is adjusted to pH 8.5 with hydrochloric acid, and most of the ethanol is evaporated off. The precipitate is collected and refluxed for a few minutes with 200 ml. of a hydroalcoholic solution of hydrogen chloride. After cooling some undissolved starting compound is filtered off and the filtrate is adjusted to pH 8.5. The desired steroidal α-amino-acid precipitates in the form of internal salt and is collected and dried. It has one molecule of crystallization water.

Analysis for $C_{20}H_{31}NO_3 \cdot H_2O$, (M.W. 351.47).—Calc.: C, 68.34; H, 9.46; N, 3.99. Found: C, 68,09; H, 9.61; N, 4.12.

When heating with acetic anhydride is followed by dilution with water at 50–60° C., on cooling the 3β-acetoxy-17β-acetamidoandrost-5-ene-17α-carboxylic acid precipitates, M.P. 251–253° C., $[a]_D^{25}$ —39.5° (c. 0.5, methanol).

(c) 3β - acetoxy-spiro-[androst-5-ene-17,4'-(3'β)-oxazoline]-2'-methyl-5'-one. The above obtained steroidal aminoacid (10 g.) is heated at about 100° C. for 1 hour with acetic anhydride (40 ml.), then the acetic anhydride is distilled off in vacuo and the residue is crystallized from methanol.

M.P. 185–187° C. $[\alpha]_D^{25}$ —113.5° (c. 0.5, methanol).
Analysis for $C_{24}H_{33}NO_4$.—Calc.: C, 72.15; H, 8.33; N, 3.51. Found: C, 72.06; H, 8.38; N, 3.58.

The compound may be identically obtained from the diacetyl derivative described above sub (b).

EXAMPLE 2

3β-acetoxy-spiro-[androst-5-ene-17.4'-(3'α)-oxazoline]-2'-methyl-5'-one (a) 3β-hydroxy - 17α - aminoandrost-5-ene-17β-carboxylic acid. Prepared from the 3'α-isomer obtained in Example 1(a), by the identical process as described in Example 1(b). The compound contains one molecule of crystallization water.

Analysis for $C_{20}H_{31}NO_3 \cdot H_2O$ (M.W. 351.47)—calc.: C, 68.34; H, 9.46; N, 3.99. Found: C, 68.52; H, 9.52; N, 4.05.

The diacetyl derivative, obtained as indicated in Example 1 (b), has M.P. 268–271° C. and $[\alpha]^{25}$ —94.2° (c. 0.5, methanol).

(b) 3β-acetoxy-spiro-[androst - 5 - ene-17,4'-(3'α)-oxazoline-2'-methyl-5'-one. Prepared from the above obtained steroidal aminoacid by the process of Example 1(c).

M.P. 157–159° C. $[\alpha]_D^{25}$ 0° (c. 0.5, methanol).
Analysis for $C_{24}H_{33}NO_4$—Calc.: C, 72.15; H, 8.33; N, 3.51. Found: C, 72.24; H, 8.43; N, 3.60.

The compound may be analogously obtained from the diacetyl derivative described sub(a).

EXAMPLE 3

3β-acetoxy-spiro-[5α-androstane-17,4'-(3'β)-oxazoline]-2'-methyl-5'-one (a) Resolution of the mixture of 3β-hydroxy-spiro-[5α-androstane-17,4'-(3'α)-imidazolidine]-2',5'-dione and its 3'β-isomer.

A mixture (48.3 g.) containing 3β-hydroxyspiro-[5α-androstane-17,4'-(3'α)-imidazolidine]-2',5'-dione and its 3'β-isomer is dissolved in 2800 ml. of hot pyridine and the solution is concentrated to about 350 ml. After cooling the precipitated 3'β-isomer is collected and dried. It does not melt until 350° C. and shows $[\alpha]_D^{25}$ —45° (c. 0.5, pyridine).

The 3'α-isomer is obtained from the mother liquor by further concentration. It has no melting point under 350° C. and shows $[\alpha]_D^{25}$+4.1 (c. 0.5, pyridine).

(b) 3β-hydroxy - 17β - amino-5α-androstane-17α-carboxylic acid. The above obtained 3'β-isomer (9 g.) is heated at 170° C. for 24 hours in a closed vessel with 450 ml. of pyridine and 270 ml. of aqueous 10 percent potassium hydroxide. After cooling the solution is concentrated to about 100 ml., diluted with about 100 ml. of water and made acidic by the addition of hydrochloric acid. The separated crystals are dissolved in 200 ml. of a 10 percent solution of hydrogen chloride in water-ethanol and precipitated by adjustment to pH 8.5.

The steroidal α-amino-acid obtained in the form of internal salt, has one molecule of crystallization water.

Analysis for $C_{20}H_{33}NO_3 \cdot H_2O$ (M.W. 353.46).—Calc.: C, 67.95; H, 9.98; N, 3.96. Found: C, 68.04; H, 9.99; N, 3.76.

The diacetyl derivative has M.P. 264–265° C. and $[\alpha]_D^{25}$ 0° (c. 0.5, methanol).

(c) 3β-acetoxy-spiro - [5α - androstane-17,4'-(3'β)-oxazoline]-2'-methyl-5'-one. Prepared from the above obtained steroidal α-aminoacid by the identical process as described in Example 1(c). M.P. 199–201° $[\alpha]_D^{25}$=—58 (c. 0.5 methanol).

Analysis for $C_{24}H_{35}NO_4$.—Calc.: C, 71.79; H, 8.79; N, 3.49. Found: C, 71.65; H, 9.00; N, 3.59.

The compound may be analogously obtained from the diacetyl derivative described sub b).

EXAMPLE 4

3β-acetoxy-spiro-[5α-androstane-17,4'-(3'α)-oxazoline]-2'-methyl-5'-one

Prepared as described in Example 3 for the 3'β-isomer, starting from 3β - hydroxy-spiro-[5α-androstane-17,4'-(3'α)-imidazolidine]-2',5'-dione, through the intermediate 3β-hydroxy-17α-amino-5α-androstane-17β-carboxylic acid, the diacetyl derivative of which has M.P. 275–277° C. and $[\alpha]_D^{25}$ —62° (c. 0.5, methanol).

The end compound, which can be prepared both from the α-aminoacid and its diacetyl derivative, shows the following properties:

M.P. 170–171° $[\alpha]_D^{25}$=+50.8 (c. 0.5 methanol).
Analysis for $C_{24}H_{35}NO_4$ (401.53).—Calc.: C, 71.79; H, 8.79; N, 3.49. Found: C, 71.71; H, 881; N, 3.75.

We claim:
1. A process for preparing spiro-andorstane-oxazolinones of the formula

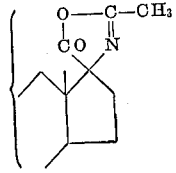

which comprises subjecting a spiro-androstane-hydantoin of the formula

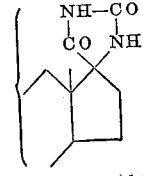

to hydrolysis with an alkali metal hydroxide at 150–200° C. for 3–10 hours in a mixture of water and a water soluble solvent selected from pyridine and lower alkanols, and heating the obtained steroidal α-a-minoacids of the formula

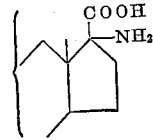

with acetic anhydride at a temperature between about 90° and the boiling temperature of the anhydride.

2. A spiro-androstane-oxazolinone of the formula

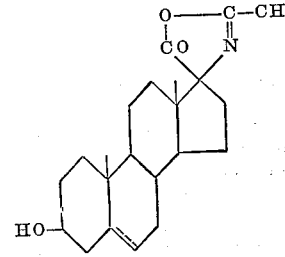

3. 3β-acetoxy-spiro-[androst-5-ene-17,4'-(3'α)-oxazoline]-2'-methyl-5'-one.

4. 3β-acetoxy-spiro-[androst-5-ene-17,4'-(3'β)-oxazoline]-2'-methyl-5'-one.

5. 3β-acetoxy-spiro-[5α-androstane-17,4'-(3'α)-oxazoline]-2'-methyl-5'-one.

6. 3β-acetoxy-spiro-[5α-androstane-17,4'-(3'β)-oxazoline]-2'-methyl-5'-one.

7. A steroidal α-aminoacid of the formula

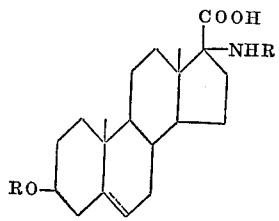

wherein R is a member selected from hydrogen and acetyl.

8. 3β-hydroxy-17β-aminoandrost-5-ene-17α-carboxylic acid.

9. 3β-acetoxy-17β-acetamidoandrost-5-ene-17α-carboxylic acid.

10. 3β-hydroxy-17α-aminoandrost-5-ene-17β-carboxylic acid.

11. 3β-acetoxy-17α-acetamidoandrost-5-ene-17β-carboxylic acid.

12. 3β-hydroxy-17β-amino-5α-androstane-17α-carboxylic acid.

13. 3β-acetoxy-17β-acetamido-5α-androstane-17α-carboxylic acid.

14. 3β-hydroxy-17α-amino-5α-androstane-17β-carboxylic acid.

15. 3β-acetoxy-17α-acetamido-5α-androstane-17β-carboxylic acid.

References Cited

UNITED STATES PATENTS 3,338,892   8/1967   Farkas _____ 260—239.55

OTHER REFERENCES

Nathansohn, C. G. et al., Steroids, 1965, 3, pp. 263–277.

LEWIS GOTTS, *Primary Examiner.*

E. G. LOVE, *Assistant Examiner.*